United States Patent

Ball et al.

[11] Patent Number: 5,222,278
[45] Date of Patent: Jun. 29, 1993

[54] TONGUE ASSEMBLY

[75] Inventors: Keith R. Ball, New Baltimore; Phillip H. McCune, Mt. Clemens, both of Mich.

[73] Assignee: TRW Vehicle Safety Systems Inc., Lyndhurst, Ohio

[21] Appl. No.: 798,541

[22] Filed: Nov. 26, 1991

[51] Int. Cl.⁵ ............................................. A44B 11/00
[52] U.S. Cl. ........................................ 24/198; 24/170; 24/196; 297/483
[58] Field of Search ................ 24/198, 197, 196, 170, 24/171, 633, 634; 297/483, 476

[56] References Cited

U.S. PATENT DOCUMENTS

| | | | |
|---|---|---|---|
| 634,014 | 10/1899 | Molloy | 24/198 |
| 2,228,379 | 1/1941 | Woodard . | |
| 2,257,494 | 9/1941 | Brown | 24/196 |
| 3,982,769 | 9/1976 | Farlind | 297/483 |
| 4,180,283 | 12/1979 | Ziv . | |
| 4,389,756 | 6/1983 | Kasama | 24/171 |
| 4,637,099 | 1/1987 | Kasai | 24/197 |
| 4,878,272 | 11/1989 | Kotikovsky et al. | 24/196 |
| 4,962,572 | 10/1990 | Prentkowski | 24/196 |
| 5,050,274 | 9/1991 | Staniszewski et al. | 24/196 |
| 5,058,244 | 10/1991 | Fernandez | 24/170 |

Primary Examiner—Victor N. Sakran
Attorney, Agent, or Firm—Tarolli, Sundheim & Covell

[57] ABSTRACT

A vehicle safety apparatus for restraining movement of a vehicle occupant or a child seat includes a tongue assembly and belt webbing which is selectively extensible through the tongue assembly along either a first path or a second path. The first path includes first and second webbing openings in the tongue assembly through which the belt webbing is extensible and slidable when the safety apparatus is used to restrain movement of a vehicle occupant. The second path includes the first and second webbing openings and further includes a third webbing opening in the tongue assembly. The belt webbing may selectively be extended through the third webbing opening to block movement of the belt webbing through the tongue assembly when the safety apparatus is used to restrain movement of a child seat.

12 Claims, 2 Drawing Sheets

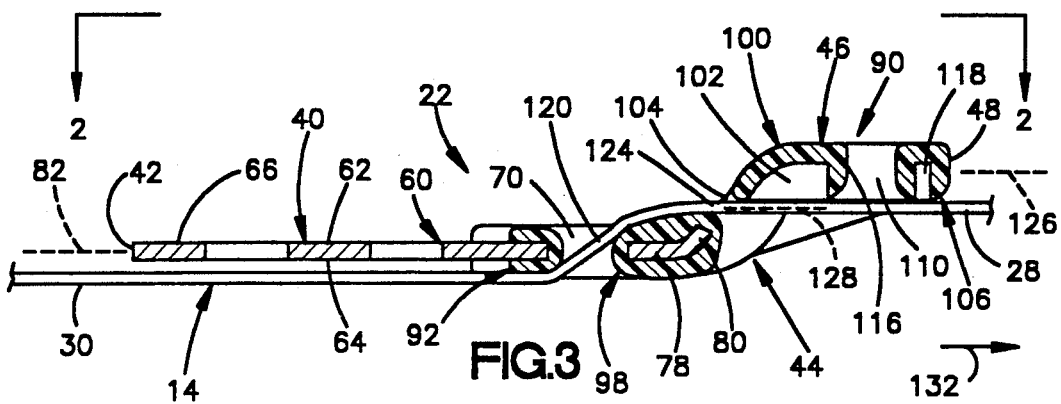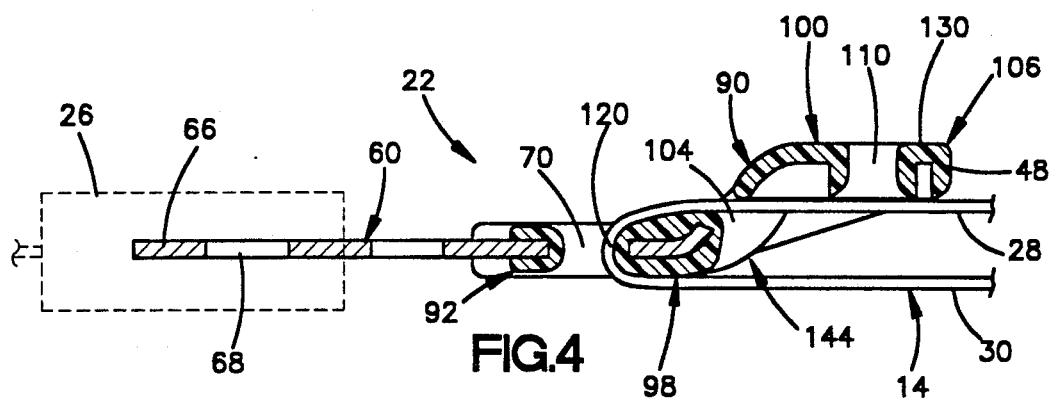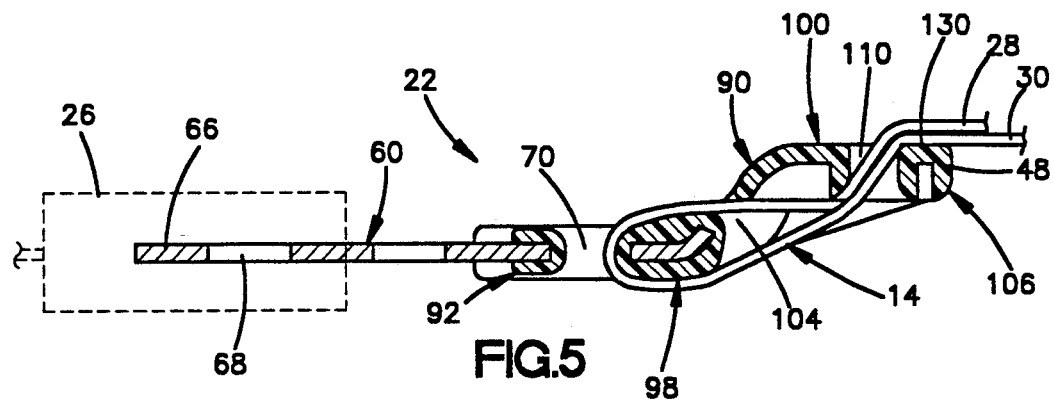

TONGUE ASSEMBLY

BACKGROUND OF THE INVENTION

1. Technical Field

The present invention relates to a tongue assembly for use in a vehicle seat belt system for restraining movement of an occupant of a vehicle.

2. Description of the Prior Art

A known vehicle seat belt system is a three-point continuous loop seat belt system. A three-point continuous loop seat belt system includes a seat belt retractor and a length of belt webbing. The belt webbing extends from the retractor through a D-ring fixed to the vehicle and then down to an anchor point near the vehicle floor. A tongue assembly is slidable along the length of belt webbing between the D-ring and the anchor point. To use the seat belt system, a vehicle occupant grasps the tongue assembly and inserts it into a buckle on the opposite side of the vehicle seat from the anchor point. When the tongue assembly is fastened in the buckle, a portion of the belt webbing extends across the lap of the vehicle occupant and a portion of the belt webbing extends diagonally across the torso of the vehicle occupant.

When the tongue assembly is released from the buckle, the belt webbing is wound onto the retractor. As the retractor winds the belt webbing, the tongue assembly may be moved along with the belt webbing. The tongue assembly may engage the D-ring before the belt webbing is completely stowed on the retractor. If the belt webbing cannot be pulled freely through the tongue assembly when the tongue assembly engages the D-ring, belt retraction stops, and some belt webbing is left loose and unretracted. Accordingly, it is desirable for a tongue assembly to allow the belt webbing to run freely through the tongue assembly when the tongue assembly is adjacent a D-ring.

A three-point continuous loop seat belt system may sometimes be used to secure a child seat, rather than a vehicle occupant, on the vehicle seat. In such a case, the lap portion of the belt webbing holds the child seat on the vehicle seat. The seat belt system must be placed in a condition so that the lap portion of the belt webbing cannot be lengthened, in order to hold the child seat securely in position on the vehicle seat.

If the tongue assembly does not itself clamp the lap portion of the belt webbing, a known child clip can be placed on the belt webbing at a location separate from the tongue assembly. The lap and torso portions of the belt webbing are threaded through the child clip. The child clip blocks movement of the lap and torso portions of the belt webbing through the child clip, and thus the tongue assembly, thereby securing the child seat on the vehicle seat.

Since a child clip is a separate piece from the remainder of the seat belt system, it is easy to lose the child clip. Also, if the child clip is inadvertently not placed on the belt webbing when the seat belt system is to be used for restraining movement of a child seat, then the child seat is not fully secured by the seat belt system. Accordingly, it is desirable that a tongue assembly be capable of blocking movement of the belt webbing through the tongue assembly when it is desired to secure a child seat.

SUMMARY OF THE INVENTION

The present invention is a tongue assembly for use in a vehicle safety apparatus in which belt webbing restrains movement of a vehicle occupant or a child seat when the tongue assembly is engaged with a seat belt buckle. The tongue assembly has a latching portion for engagement with the seat belt buckle. The tongue assembly has a first path along which the belt webbing is selectively extensible through the tongue assembly. The first path includes first and second webbing openings in the tongue assembly through which the belt webbing is extensible and slidable when the safety apparatus is used to restrain movement of a vehicle occupant. The tongue assembly also has a second path along which the belt webbing is selectively extensible through the tongue assembly. The second path also includes the first and second webbing openings. The second path further includes means for blocking sliding movement of the belt webbing through the tongue assembly. The means for blocking sliding movement includes means for defining a third webbing opening in the tongue assembly through which the belt webbing may selectively be extended when the safety apparatus is used to restrain movement of a child seat. In a preferred embodiment of the invention, the tongue assembly includes a metal base and a plastic body portion fixed to the metal base. The plastic body portion includes a pair of locking fingers for defining the third webbing opening in the tongue assembly. The locking fingers are spaced from each other to define a passage through which the belt webbing may selectively be inserted into the third webbing opening. The portion of the tongue assembly including the locking fingers is formed from the plastic material of the plastic body portion of the tongue assembly.

BRIEF DESCRIPTION OF THE DRAWINGS

The foregoing and other features of the present invention will become apparent to one skilled in the art upon a consideration of the following description of the invention with reference to the accompanying drawings, wherein:

FIG. 3 is a sectional view taken along line 3—3 of FIG. 2 and showing belt webbing in a condition to run freely through the tongue assembly;

FIG. 4 is a view similar to FIG. 3 and showing the tongue assembly and belt webbing in a condition for restraining movement of a vehicle occupant; and FIG. 5 is a view similar to FIG. 3 and showing the tongue assembly and belt webbing in a condition for restraining movement of a child seat.

DESCRIPTION OF A PREFERRED EMBODIMENT

Figure 1:
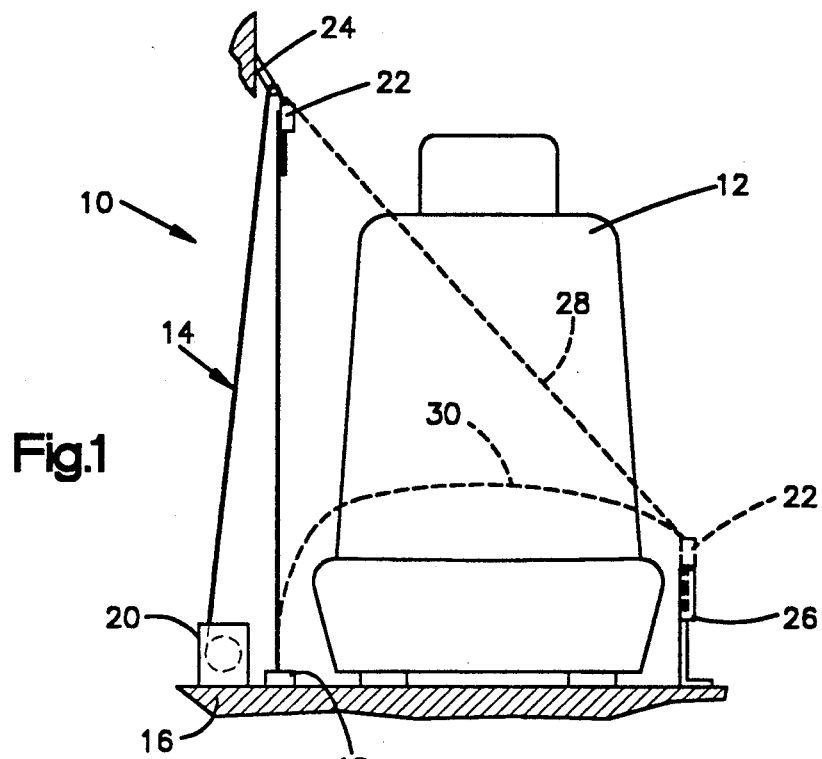
FIG. 1 is a schematic illustration of a vehicle seat belt system having a tongue assembly in accordance with the present invention.

The present invention is illustrated in FIG. 1 as applied to a three-point continuous loop seat belt system 10 for use in restraining a child seat or an occupant of a vehicle against movement relative to the vehicle. It should be understood that the invention could be applied to other belt systems. The seat belt system 10 will first be described with reference to its use in restraining movement of a vehicle occupant.

During operation of the vehicle, an occupant of the vehicle sits on a seat 12 which is illustrated as a front passenger seat in the vehicle. A length of belt webbing 14 is extendible about the vehicle occupant. One end of the length of belt webbing 14 is anchored to the vehicle body 16 at an anchor point 18 on the outboard side of the seat 12. The opposite end of the belt webbing 14 is attached to a retractor 20 secured to the vehicle body also on the outboard side of the seat 12. Intermediate its ends, the belt webbing 14 passes through a tongue assembly 22 and through a D-ring 24 mounted on the vehicle above the retractor 20 and the anchor point 18. When the seat belt system 10 is not in use, the belt webbing 14 is wound on the retractor 20 and is oriented generally vertically on the outboard side of the seat 12, as shown in solid lines in FIG. 1.

To engage the seat belt system 10, the tongue assembly 22 is manually grasped and is pulled across the lap and torso of the occupant sitting in the seat 12. As the tongue assembly 22 is pulled across the lap and torso of the occupant, the tongue assembly 22 moves along the belt webbing 14, and the belt webbing 14 is unwound from the retractor 20. When the belt webbing 14 has been pulled across the lap and torso of the occupant, the tongue assembly 22 is connected with a buckle 26, as shown in dashed lines in FIG. 1. The buckle 26 is connected to the vehicle body 16 and is disposed on the inboard side of the seat 12 opposite the anchor point 18. When the seat belt system 10 is thus buckled, the length of belt webbing 14 is divided by the tongue assembly 22 into a torso portion 28 which extends diagonally across the torso of the occupant and a lap portion 30 which extends across the lap of the occupant.

Figure 2:
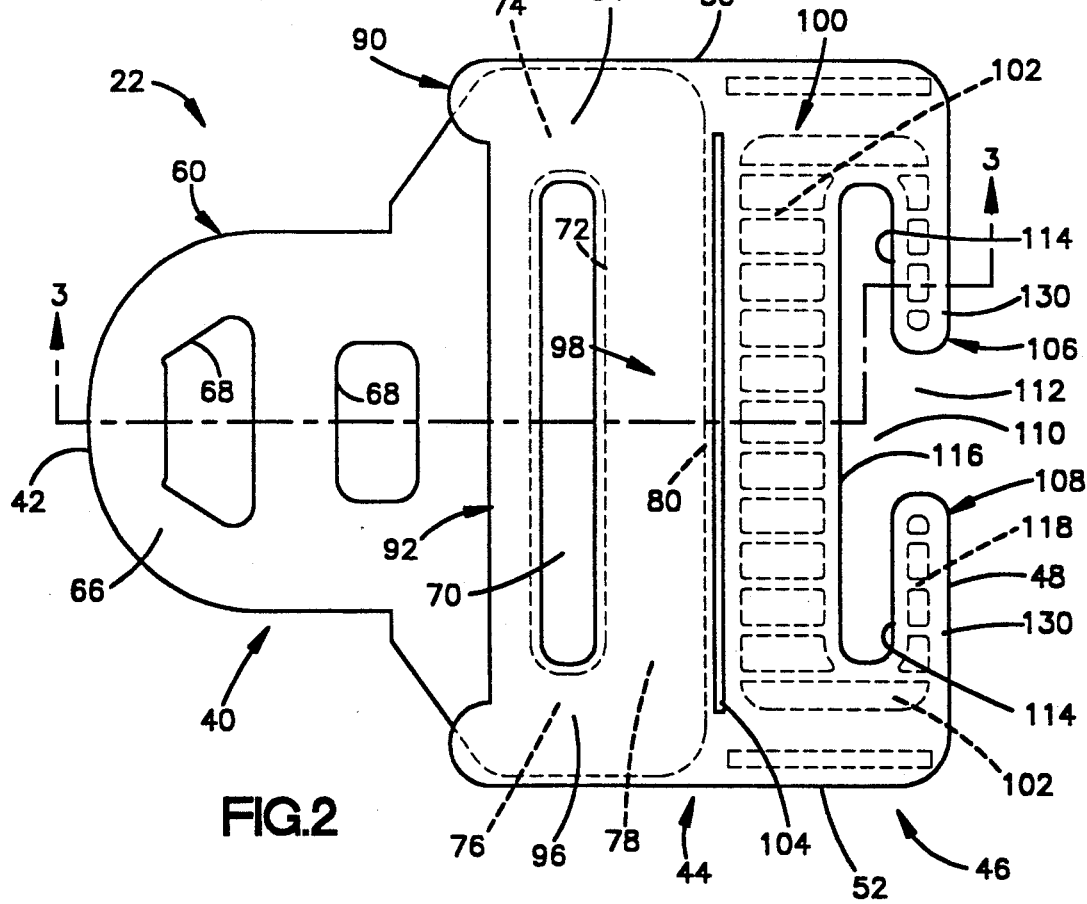
FIG. 2 is a top plan view of the tongue assembly used in the seat belt system of FIG. 1.

The tongue assembly 22 (FIGS. 2-5) has a generally planar leading end portion 40 which includes a leading edge 42 of the tongue assembly 22. A connector portion 44 of the tongue assembly 22 extends rearwardly from (to the right as viewed in FIGS. 2-5) and at an angle to, the leading end portion 40. A generally planar trailing end portion 46 of the tongue assembly 22 extends rearwardly from and at an angle to the connector portion 44. The trailing end portion 46 is parallel to and offset from the leading end portion 40. The trailing end portion 46 of the tongue assembly 22 includes a trailing edge 48 of the tongue assembly 22. The tongue assembly 22 also has opposed side edges 50 and 52 (FIG. 2).

The tongue assembly 22 includes a metal base 60. The base 60 is a generally planar piece of metal having an upper major side surface 62 (FIG. 3) and a lower major side surface 64. The base 60 includes a latching portion 66 through which extend two latching openings 68 for receiving portions of the buckle 26. The base 60 is preferably made from SAE 4140 steel which is heat treated and chrome plated. A first webbing opening 70 extends through the metal base 60 and is partially defined by an edge surface 72 (FIG. 2) in the metal base 60. The webbing opening 70 is wide enough to allow the belt webbing 14 to pass freely through the webbing opening 70.

Two side portions 74 and 76 of the metal base 60 are located on opposite sides of the webbing opening 70. A trailing end portion 78 of the metal base 60 is located at the opposite end of the metal base 60 from the latching portion 66. The rearmost portion 80 (FIG. 3) of the trailing end portion 78 is bent out of the plane 82 of the base 60, upwardly as seen in FIG. 3.

A plastic body portion 90 of the tongue assembly 22 is molded on the metal base 60. The plastic body 90 is preferably molded from Zytel ® (a trademark of E.I. Dupont de Nemours & Co.) brand plastic. The plastic body 90 is molded all in one piece on the metal base 60. This portion of the tongue assembly 22 is made of plastic to reduce weight and cost and to satisfy customer preferences for plastic rather than metal grasping surfaces.

The plastic body 90 includes a front portion 92 on the latching portion 66 of the metal base 60. Two side portions 94 and 96 (FIG. 3) of the plastic body 90 cover the side portions 74 and 76, respectively, of the metal base 60. A central portion 98 of the plastic body 90 covers the trailing end portion 78 of the metal base 60. The central portion 98 of the plastic body 90, the side portions 94 and 96 and the front portion 92 each wrap around the edge surface 72 to define the first webbing opening 70 in the metal base 60.

A trailing end portion 100 of the plastic body 90 is disposed rearwardly of the central portion 98. A plurality of strengthening ribs 102 are molded into the underside of the trailing end portion 100. The central portion 98 and the trailing end portion 100 of the plastic body 90 define between them a second webbing opening 104 which extends through the tongue assembly 22. The second webbing opening 104, like the first webbing opening 70, is wide enough to allow the belt webbing 14 to run freely through the opening 104.

The trailing end portion 100 of the plastic body 90 includes two locking fingers 106 and 108 (FIG. 2). The locking fingers 106 and 108 are spaced from each other to define between them a passage 112 into a third webbing opening or locking opening 110. Each locking finger 106 and 108 has a forwardly facing edge surface 114. The trailing end portion 100 has a rearwardly facing surface 116 which together with the surfaces 114 of the locking fingers 106 and 108 partially defines the locking opening 110. A plurality of strengthening ribs 118 are molded into the underside of each locking finger 106 and 108. The locking opening 110 is wide enough to allow the belt webbing 14 to run freely through the opening 110.

FIG. 3 illustrates the tongue assembly 22 in the condition when, for example, the belt webbing 14 of the safety apparatus 10 (FIG. 1) is stowed and the tongue assembly 22 is adjacent the D-ring 24. The tongue assembly 22 is disengaged from the buckle 26. In this disengaged condition, the belt webbing 14 can run relatively freely through the tongue assembly 22. The lap portion 30 of the belt webbing 14 extends parallel to and along the latching portion 66 of the metal base 60 of the tongue assembly 22. A portion 120 (FIG. 3) of the belt webbing 14 extends through the first webbing opening 70. Another portion 124 of the belt webbing 14 extends through the second webbing opening 104. The belt webbing 14 does not extend through the locking opening 110.

The vehicle occupant buckles the safety apparatus 10 by engaging the latching portion 66 of the tongue assembly 22 with the buckle 26. Thereafter, the vehicle occupant pulls on the torso portion 28 of the belt webbing 14 until enough belt webbing passes through the tongue assembly 22 to make the lap portion 30 fit tightly around the occupant's lap. The vehicle occupant then releases the torso portion 28 of the belt webbing 14. The safety apparatus 10 is then in the buckled condition as shown in dashed lines in FIG. 1. The tongue assembly 22 is in the condition shown in FIG. 4.

When the tongue assembly is in the condition shown in FIG. 4, the belt webbing 14 assumes a U-shape within the tongue assembly 22. The belt webbing 14 is wrapped around the central portion 98 of the plastic body 90 and the trailing end portion 78 of the metal base 60. The belt webbing 14 extends through the first webbing opening 70 which is disposed generally in the plane 82 (FIG. 3) of the base 60 of the tongue assembly 22. The belt webbing 14 also extends through the second webbing opening 104 which is disposed generally in a plane 128 (FIG. 3) offset from the plane 82 of the base 60. Both the lap portion 30 and the torso portion 28 of the belt webbing 14 extend away from the trailing edge 48 of the tongue assembly 22. The torso portion 28 of the belt webbing 14 is under tension from retraction force applied by the retractor 20. The belt webbing 14 is movable through the tongue assembly 22. The retractor 20 can lock in an emergency to block withdrawal of belt webbing 14 from the retractor 20 and thus restrain movement of an occupant of the vehicle seat 12.

When the vehicle occupant unbuckles the seat belt system 10 the tension on the lap portion 30 of the belt webbing 14 is released. The retractor 20 pulls on the torso portion 28 of the belt webbing 14 and winds belt webbing on the retractor 20. The tongue assembly 22 is pulled across the torso of the vehicle occupant until the tongue assembly 22 reaches the D-ring 24. If the tongue assembly 22 does not reach the D-ring 24 before the system attains a stowed state, the tongue assembly 22 will remain on the webbing 14 at the position it was released from the buckle 26. This occurs because of the friction inherent between the tongue assembly 22 and the belt webbing 14.

When the tongue assembly 22 reaches the D-ring 24, the tongue assembly 22 is in a generally vertical position as illustrated in solid lines in FIG. 1. The tongue assembly 22 is in the condition shown in FIG. 3. The retractor 22 pulls belt webbing 14 through the tongue assembly 22 in the direction indicated by the arrow 132 in FIG. 3. The belt webbing 14 can run relatively freely through the tongue assembly 22 without encountering substantial resistance.

When the safety apparatus 10 is to be used for restraining movement of a child seat (not shown) relative to the vehicle seat 12, the tongue assembly 22 is first engaged with the buckle 26 to secure the child seat loosely in position on the vehicle seat 12. The vehicle occupant manipulates the belt webbing 14 so that the retractor 20 takes up slack in the belt webbing 14.

The torso portion 28 and the lap portion 30 of the belt webbing 14 are then brought together so that they overlie each other under the trailing end portion 100 of the tongue assembly 22. The webbing portions 28 and 30 are gathered or folded longitudinally in a manner so that they may be inserted through the passage 112 (FIG. 2) in the tongue assembly 22. The webbing portions 28 and 30 are threaded through the passage 112 (upwardly out of the plane of the paper as viewed in FIG. 2) between the locking fingers 106 and 108 and into the locking opening 110. The webbing portions 28 and 30 are then released so that they extend transversely for their full width within the locking opening 110.

In this condition, the webbing portions 28 and 30 extend from the tongue assembly 22 over the upper surfaces 130 of the locking fingers 106 and 108, as seen in FIG. 5. The lap portion 30 extends from the tongue assembly 22 through the child seat on the vehicle seat 12, to the anchor 18. The torso portion 28 extends from the tongue assembly 22 to the D-ring 24.

When the tongue assembly 22 and safety apparatus 10 are in the condition illustrated in FIG. 5, both webbing portions 28 and 30 extend through the locking opening 110. The locking opening 110 is in a plane 126 (FIG. 3) offset from the plane 82 of the first webbing opening 70 and from the plane 128 of the second webbing opening 104. The belt webbing 14 thus extends through the tongue assembly 22 in a tortuous path between the first webbing opening 70, the second webbing opening 104, and the third webbing opening 110. The torso portion 28 and lap portion 30 overlie each other and cinch against each other as they extend through the third webbing opening 110. The tongue assembly 22 blocks movement of the belt webbing 14 through the tongue assembly 22 under loads experienced during normal riding conditions. Therefore, a separate child clip, in addition to the tongue assembly 22, is not needed to secure the child seat.

From the above description of the invention, those of ordinary skill in the art will perceive improvements, changes and modifications in the invention. Such improvements, changes and modifications within the skill of the art are intended to be covered by the appended claims.

We claim:

1. A tongue assembly for use in a vehicle safety apparatus in which a first length of belt webbing restrains movement of a vehicle occupant or a child seat when said tongue assembly is engaged with a seat belt buckle, said tongue assembly comprising:

a latching portion for engagement with the seat belt buckle;

means for defining a first path along which the first length of belt webbing is selectively extensible through said tongue assembly, said means for defining a first path including means for defining first and second webbing openings in said tongue assembly through which the first length of belt webbing is extensible and slidable when the safety apparatus is used to restrain movement of a vehicle occupant, said first path including said first and second webbing openings; and means for defining a second path different from said first path along which the first length of belt webbing is selectively extensible through said tongue assembly, said means for defining a second path including said means for defining said first and second webbing openings in said tongue assembly, said second path including said first and second webbing openings, said means for defining a second path further including means for blocking sliding movement of the first length of belt webbing through said tongue assembly when the safety apparatus is used to restrain movement of a child seat.

2. A tongue assembly as defined in claim 1 wherein said means for blocking sliding movement of the first length of belt webbing includes means for defining a third webbing opening in said tongue assembly through which the first length of belt webbing is selectively extended when the safety apparatus is used to restrain movement of a child seat, said second path including said third webbing opening.

3. A tongue assembly as defined in claim 2 having a leading end portion including said latching portion of said tongue assembly and a trailing end portion including said means for defining a third webbing opening in said tongue assembly.

4. A tongue assembly as defined in claim 2 wherein said first webbing opening and said second webbing opening and said third webbing opening are each disposed in separate planes.

5. A tongue assembly as defined in claim 2 wherein said means for defining a third webbing opening in said tongue assembly comprises a pair of locking fingers spaced from each other to define a passage through which the belt webbing may be threaded into said third webbing opening.

6. A tongue assembly as defined in claim 5 wherein said tongue assembly comprises a metal base and a plastic portion fixed to said base, said plastic portion including said pair of locking fingers.

7. A tongue assembly as defined in claim 1 wherein said means for blocking movement comprises a pair of locking fingers on said tongue assembly.

8. A tongue assembly as defined in claim 7 wherein said tongue assembly comprises a metal base and a plastic body molded on said metal base, said plastic body including said locking fingers.

9. A tongue assembly as defined in claim 7 wherein said locking fingers at least partially define a locking opening in said tongue assembly through which the belt webbing is selectively threaded to block movement of the belt webbing through said tongue assembly, said second path including said locking opening.

10. A safety apparatus for use in restraining a child seat or an occupant of a vehicle against movement relative to a vehicle seat, said safety apparatus comprising:
a belt webbing having a first portion extensible across the lap of the vehicle occupant and a second portion extensible across the torso of the vehicle occupant; and
a tongue assembly slidably mounted on said belt webbing and connectable with a buckle fixed to the vehicle adjacent the vehicle seat, said tongue assembly comprising:
a first generally planar portion including a latching portion for engagement with the buckle, said first planar portion including means for defining a first webbing opening through which a single thickness of said belt webbing extends;
a connector portion extending at an angle from said first planar portion, said connector portion including means for defining a second webbing opening through which a single thickness of said belt webbing extends; and
a second generally planar portion extending from said angled connector portion generally parallel to and offset from said first planar portion, said second planar portion including means for defining a third webbing opening through which said belt webbing is selectively extensible;
said second webbing opening being offset from the plane of said first webbing opening to permit said first and second portions of said belt webbing to remain spaced from each other and thereby permit sliding movement of said belt webbing through said tongue assembly when said belt webbing extends through said first and second webbing openings but not through said third webbing opening;
said third webbing opening being formed to receive both said first portion and said second portion of said belt webbing, said third webbing opening being offset from the planes of said first and second webbing openings whereby said first and second portion of said belt webbing cinch against each other to block sliding movement of said belt webbing through said tongue assembly when said belt webbing extends through said first and second and third webbing openings.

11. A tongue assembly as defined in claim 10 comprising a pair of spaced locking fingers partially defining said third webbing opening and defining between them a passage through which said first and second portions of said belt webbing is manually inserted into said third opening.

12. A tongue assembly as defined in claim 11 wherein said tongue assembly includes a metal base and a plastic member fixed to said base, said plastic member including said locking fingers.

* * * * *